US011163551B1

(12) United States Patent
Biala et al.

(10) Patent No.: US 11,163,551 B1
(45) Date of Patent: Nov. 2, 2021

(54) SYSTEMS AND METHODS FOR IMPROVED SMART INFRASTRUCTURE DATA TRANSFER

(71) Applicant: Argo AI, LLC, Pittsburgh, PA (US)

(72) Inventors: Ilan Biala, Pittsburgh, PA (US); Michel H. J. Laverne, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 0 days.

(21) Appl. No.: 17/069,483

(22) Filed: Oct. 13, 2020

(51) Int. Cl.
    *G06F 9/445* (2018.01)
    *G06F 8/65* (2018.01)
    *H04L 29/08* (2006.01)

(52) U.S. Cl.
    CPC ............... *G06F 8/65* (2013.01); *H04L 67/34* (2013.01)

(58) Field of Classification Search
    CPC ..................................... G06F 8/65; H04L 67/34
    See application file for complete search history.

(56) References Cited

U.S. PATENT DOCUMENTS

| | | |
|---|---|---|
| 8,964,667 B2 | 2/2015 | Nagaraja |
| 9,686,811 B2 | 6/2017 | Chen et al. |
| 9,832,241 B1 | 11/2017 | Hayward |
| 9,836,062 B1 | 12/2017 | Hayward |
| 9,936,011 B2 | 4/2018 | Toriumi |

(Continued)

FOREIGN PATENT DOCUMENTS

| | | |
|---|---|---|
| CN | 103116825 A | 5/2013 |
| WO | 2016147043 A2 | 9/2016 |

OTHER PUBLICATIONS

"Smart Street Lighting for Smart(er) Cities", TViLight Empowering Intellegence, 2019, pp. 1-29, Tvilight Projects B.V., The Netherlands.

(Continued)

*Primary Examiner* — Chuck O Kendall
(74) *Attorney, Agent, or Firm* — Brooks Kushman P.C.

(57) ABSTRACT

Systems, methods, and computer-readable media are disclosed for a systems and methods for improved smart infrastructure data transfer. An example method may involve determining, at a first time, that a first number of smart infrastructure devices included within a smart infrastructure system are accessible over a network. The example method may also involve creating a first software image including a software update for the first number of smart infrastructure devices. The example method may also involve sending, over the network, the first software image to a device of the smart infrastructure system. The example method may also involve determining, at a second time, that a second number of smart infrastructure devices included within the smart infrastructure system are accessible over the network. The example method may also involve determining that the first number of devices is different than the second number of devices. The example method may also involve creating, based on the determination that the first number of devices is different than the second number of devices, a second software image including a software update for the second number of smart infrastructure devices. The example method may also involve sending, over the network, the second software image to a device of the smart infrastructure system.

20 Claims, 6 Drawing Sheets

(56) References Cited

U.S. PATENT DOCUMENTS

| | | |
|---|---|---|
| 10,593,197 B1 | 3/2020 | Nepomuceno et al. |
| 2014/0173581 A1* | 6/2014 | Grinberg ................ G06F 8/654 |
| | | 717/170 |
| 2016/0092209 A1* | 3/2016 | Kuchibhotla ........... H04L 67/10 |
| | | 717/170 |
| 2017/0310747 A1 | 10/2017 | Cohn et al. |
| 2018/0013655 A1 | 1/2018 | Ameixieira |
| 2018/0024537 A1 | 1/2018 | Chauvet et al. |
| 2019/0066409 A1 | 2/2019 | Moreira da Mota |

OTHER PUBLICATIONS

Alam et al. "IoT Virtualization: A Survey of Software Definition & Function Virtualization Techniques for Internet of Things", Feb. 2019, pp. 1-30, ResearchGate GmbH, Berlin, Germany.

Chen et al. "Ad Hoc Peer-to-Peer Network Architecture for Vehicle Safety Communications", Apr. 18, 2005, pp. 100-107, IEEE Communications Magazine, New York, NY.

Marzal et al. "A Novel Locality Algorithm and Peer-to-Peer Communication Infrastructure for Optimizing Network Performance in Smart Microgrids", Energies 2017, Aug. 27, 2017, pp. 1-25, vol. 10, issue 1275, MDPI AG, Basel, Switzerland.

* cited by examiner

SYSTEMS AND METHODS FOR IMPROVED SMART INFRASTRUCTURE DATA TRANSFER

BACKGROUND

Many smart infrastructure systems have their own centralized processing node that handles communication with other infrastructure systems as well as a broader system (for example, a city or an organizational system) that manages several infrastructure systems. Specifically, in the case of smart traffic infrastructure, every intersection or road requires a different set of hardware tailored to its specific layout, which causes challenges in managing software deployment to each central processing node for a particular location. As a result, either a standardized smart infrastructure hardware setup must be used that limits the capabilities of the system, or a separate configuration and deployment software must be used for each processing node and its associated hardware components, which causes issues in managing software deployment complexity. For example, when software updates need to be performed on the infrastructure, individualized software images for each of the unique smart infrastructure systems need to be created. Furthermore, when performing software updates on the smart infrastructure systems, the entire system may need to reboot, which results in an inability to access to the system to determine the status of different hardware components in the system. It may also be difficult to determine if all of the devices rebooted properly with the update.

Smart infrastructure also faces challenges in terms of how data (for example, software updates) is distributed across the smart infrastructure nodes that comprise a larger smart infrastructure network in a geographic area. There are currently two prevalent modes of distributing data across nodes: each node can have its own data connection to receive data from a cloud service, or each node can be hardwired to a central node. Both of these options present significant cost either in data transmission or the installation of far-reaching cable networks.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
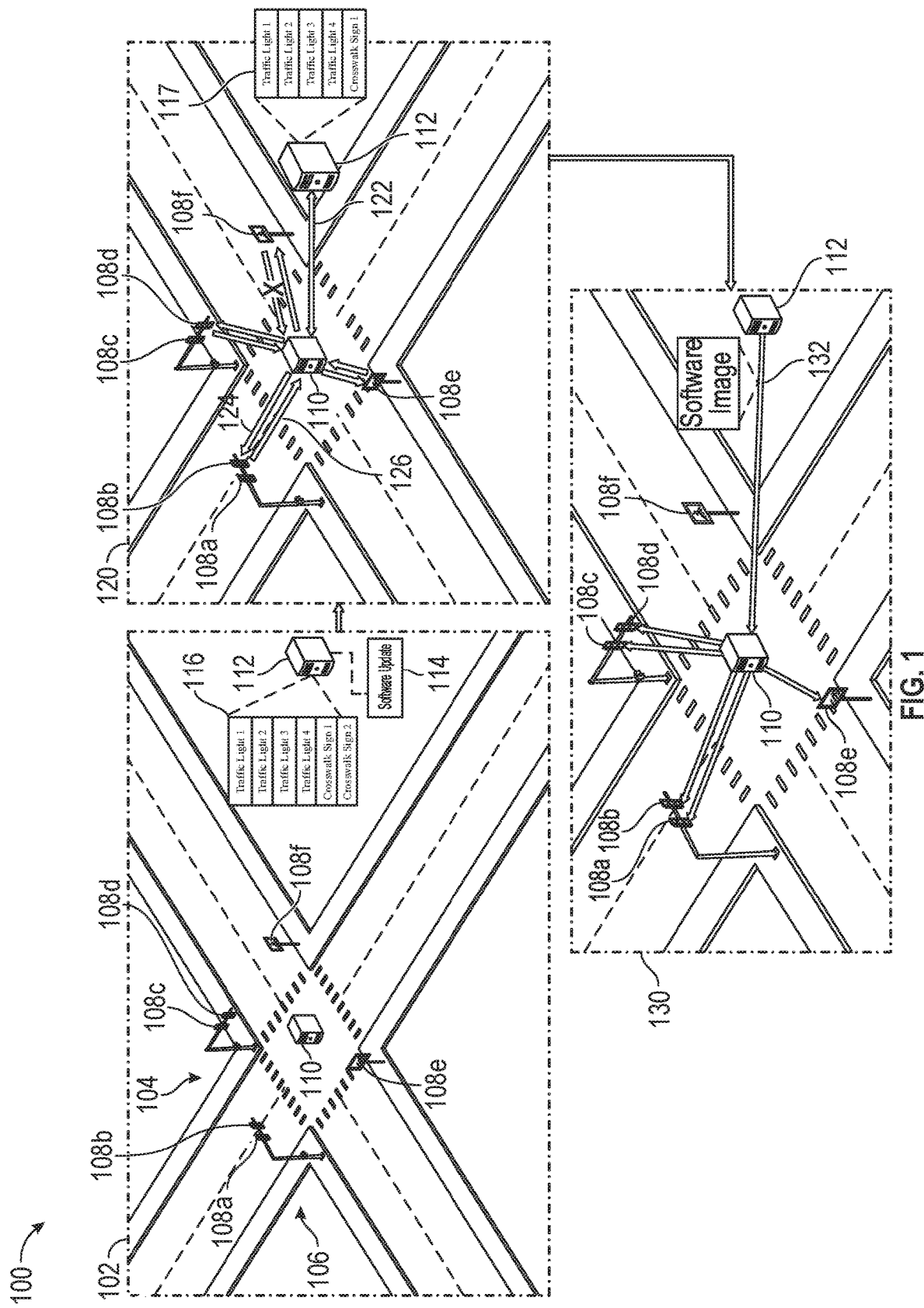
FIG. 1 depicts an example use case, in accordance with one or more example embodiments of the disclosure.

This disclosure relates to, among other things, systems and methods for improved smart infrastructure data transfer. In some embodiments, the smart infrastructure data transfer may involve software updates deployed to the smart infrastructure systems to update the software of devices that may comprise the smart infrastructure systems. However, the systems and methods described herein may also be equally applicable to any other type of general data transfer in addition to software updates. Smart infrastructure as described herein may refer to any infrastructure that is capable of communicating with devices that are located externally to the infrastructure. Smart infrastructure may describe devices that enable a more intelligent understanding of the physical world and better interactions with the underlying infrastructure As one example, smart infrastructure may include devices associated with a road intersection, such as traffic cameras, traffic lights, road sensors (for example, sensors that may be used to detect the presence of cars on the road, a temperature of the road, etc.), and the like. It should be noted that reference may be made herein to road-related types of infrastructure for consistency sake, however, any other type of infrastructure may also be applicable. For example, devices in a power grid, buildings located within a city, or any other infrastructure that is capable of being equipped with processing capabilities that allow communication with external devices. As a second example, smart infrastructure may include devices associated with a highway on ramp or the highway itself. A smart infrastructure system as described herein may refer to a group of devices located within a geographical proximity of one another (for example, a group of devices located within an imaginary geographical boundary). Each device may itself be a smart infrastructure device (the terms "smart infrastructure device" and "device" may be used interchangeably herein). For example, a smart infrastructure system may include infrastructure located at a particular road intersection. Continuing this example, the smart infrastructure system at the intersection may include two traffic cameras and two traffic lights. Each of the two traffic cameras and two traffic lights may be smart infrastructure devices. In some cases, the devices included within a smart infrastructure system may form a local communication network or may otherwise be hardwired together to allow for local communications. The devices included within the smart infrastructure system may be configured to serve one or more common purposes, such as managing traffic at the road intersection. In some instances, the smart infrastructure devices that are classified as being included within a particular smart infrastructure system may depend on this common goal, rather than the geographical proximity of the smart infrastructure devices. For example, another smart infrastructure system may include devices associated with a power grid for providing power to residential homes. Once smart infrastructure device may be located at a power plant, and several other smart infrastructure devices may be located in individual residential homes. The distance between such devices may be great in this particular example, but all of the smart infrastructure devices within this example power grid smart infrastructure system may serve the same purpose of ensuring that power is correctly provided to the residential homes.

In some embodiments, the road intersection smart infrastructure system and power grid smart infrastructure system may just two examples of types of smart infrastructure systems, and any number and/or combination of types of smart infrastructure systems may exist in an environment (for example, a city, a state, a region, or any other type of geographical area on either a smaller or larger scale). For example, one particular city may include a number of such smart infrastructure systems that may work together to ensure the functioning of the infrastructure systems found within the city. These multiple smart infrastructure systems may form a network of smart infrastructure systems that may be capable of communicating with one another (or with external devices not included within any smart infrastructure system) through permanent or temporary network connections as may be described below. In some instances, some or all of the smart infrastructure systems may be incapable of directly communicating with other smart infrastructure systems, and may require an intermediary to transmit data between such smart infrastructure systems. For example, a traffic light at an intersection in a rural town may not have the connectivity required to interact with other infrastructure remotely located from the traffic light.

In some embodiments, conventional methods for data transfer to and from such smart infrastructure systems (and/or individual devices within a smart infrastructure system) may be associated with certain inefficiencies as mentioned above. Because there may exist an endless number of different types of smart infrastructure systems and/or devices within a smart infrastructure system, complexities may be involved in providing software updates to the smart infrastructure systems. That is, either the devices included within different smart infrastructure systems need to be standardized so that the same software images can be deployed to each smart infrastructure system when software updates are necessary (which limits the capabilities of the infrastructure), or multiple software images need to be created for the different devices (which adds complexity to the software deployment). A software image may be a capture of a software execution state that may be used to configure a device to be in that execution state as well. As an analogy, an image of a computer operating system may be used to restore the computer back to factory settings. Additionally, it may be difficult to determine, without physically visiting the location of a given smart infrastructure system, if any of the devices within the smart infrastructure system are inaccessible. A device being inaccessible may mean that the device is not able to send and/or receive data to other devices. That is, the "smart" capability of the device may be unavailable. This may happen for a number of reasons, such as a malfunctioning of the smart infrastructure device. As an example, a smart infrastructure system may initially be installed with five devices, but devices can be added or removed, or one or more of the devices may experience issues that prevent them from properly functioning or being able to connect to a network to receive software updates. With this being the case, it may be difficult to determine how the software images need to be configured to deploy to a given smart infrastructure system. For example, if one of the devices is incapable of connecting to a network, or is otherwise not functional, and a software image is created that includes that device, then the software deployment may be unsuccessful. This may be because the software updates at each smart infrastructure system may be facilitated by a centralized processing node that manages all of the devices on the smart infrastructure system. If the incorrect software image including inaccessible devices if provided to the centralized processing node, then the centralized processing node may not be capable of installing the software update on any of the smart infrastructure devices. This may be because the software image may be, as described above, a capture of a program execution state, and the centralized processing node may not be able to separate out portions of the image for devices that are inaccessible Finally, some smart infrastructure systems may be located in more isolated geographical regions, and may lack the network connectivity capabilities of other smart infrastructure systems. For example, these infrastructure systems may have some capabilities to communicate with more local devices, but may lack the necessary connectivity to communicate with more remote devices (for example, may not have connection to cellular networks or long distance hardwire networks). This may result in difficulties in providing the software updates to these smart infrastructure systems.

In some embodiments, the systems and methods described herein may serve to remedy these and other inefficiencies of conventional smart infrastructure system data transfer in a number of ways. First, the systems and methods may provide for dynamic reconfiguration of software deployments to the smart infrastructure systems. As described below, this dynamic reconfiguration may allow for software images that are created for deployment to be specifically tailored to the devices that are determined to be accessible on a given smart infrastructure system, even the number and/or types of devices that are accessible changes since the initial installation of the smart infrastructure devices. The dynamic reconfiguration may also allow for tracking of the number and/or types of devices that are accessible at some or all of the smart infrastructure systems, which may be useful for a number of purposes, such as determining which devices may require servicing. Second, the systems and methods may provide unique methods for providing the software updates to the smart infrastructure (or methods for obtaining the software updates by the smart infrastructure).

In some embodiments, the first manner in which the systems and methods described herein may remedy the inefficiencies of conventional smart infrastructure software deployment methods may be through the use of dynamic reconfiguration of such software deployments. This dynamic reconfiguration may involve two phases, which may include a discovery phase followed by a dynamic reconfiguration phase. In some instances, this dynamic reconfiguration may be performed by a computing system that may either be located locally to a smart infrastructure system, or may be located remotely from multiple smart infrastructure systems (for example, the management device 506 described with respect to FIG. 5 below). The computing system may be responsible for, among other tasks, tracking the status of one or more smart infrastructure systems to identify the number and/or types of devices accessible on a smart infrastructure system, identifying an availability of a software update for a smart infrastructure system or a device or devices on a smart infrastructure system, and determining how to create or reconfigure a software image to match the accessible devices on a smart infrastructure system so that the software update may be deployed to, and correctly installed on, the smart infrastructure system. In some instances, the computing system may be a separate device from the centralized processing node that is described above as being associated with each individual smart infrastructure system. However, in some cases, any of the operations described herein with respect to the dynamic reconfiguration (or any other operations) may also be performed locally by a centralized processing node and/or any smart infrastructure devices included within a smart infrastructure system as well.

In some embodiments, the discovery phase of the dynamic reconfiguration may involve determining which smart infrastructure devices included within a smart infrastructure system are actually accessible. At the time of initial physical setup of the smart infrastructure devices on the smart infrastructure system, a reference hardware configuration may be stored that may indicate which smart infrastructure devices are located at the smart infrastructure system. As an example, a smart infrastructure system located at a road intersection may include a first traffic camera, a second traffic camera, a first traffic light, and a second traffic light. This reference hardware configuration may include any number of types of data pertaining to the smart infrastructure devices installed in the smart infrastructure system, such as a smart infrastructure device type, a smart infrastructure device function, a smart infrastructure device software revision, or any other type of data. At the time of deployment of a software update, the discovery phase may involve determining which smart infrastructure devices are still connected and accessible. A smart infrastructure device may be determined to be inaccessible for a number of reasons. For example, the inaccessible smart infrastructure device may no longer physically exist in the smart infrastructure system (may have been physically removed). As another example, the inaccessible smart infrastructure device may still physically exist at the smart infrastructure system, but may be malfunctioning in that the smart infrastructure device is incapable of sending and/or receiving network communications. Continuing the above example, it may be determined that all of the smart infrastructure devices except the second traffic camera are accessible. In some instances, this discovery phase may also be performed periodically even if no software updates are currently available and/or required for the smart infrastructure system. This may allow for the status of the devices on the smart infrastructure system to be continuously updated, which may be useful for a number of reasons, such as system troubleshooting. This may also allow be useful for system monitoring and maintenance planning and/or scheduling for smart infrastructure devices. Maintenance for these types of smart infrastructure systems may be costly, and rather than relying on manual checks by operators, having status information reported continuously (and, in some cases, only reporting when an issue is identified) may be more efficient.

In some embodiments, determining whether a smart infrastructure device is still connected and accessible may involve sending a request to a smart infrastructure device (for example, sending a data packet to the smart infrastructure device). If a response (for example, an acknowledgement packet) is received from the smart infrastructure device, then it may be determine that the smart infrastructure device is connected and accessible. However, if a response is not received from the smart infrastructure device within a predetermined amount of time, then it may be determined that the smart infrastructure device is no longer connected and accessible. In some cases, multiple requests may be sent because a lack of response from a smart infrastructure device may be a result of networking issues, such as packet loss, rather than the smart infrastructure device not being connected and accessible. This process may be repeated for any number of other smart infrastructure devices as well. In some cases, the requests may be sent to individual smart infrastructure devices, however, in other cases, requests may be sent to a single or a subset of smart infrastructure devices, and those smart infrastructure devices may forward the requests to other smart infrastructure devices. For example, all of the requests may be transmitted to a central processing node, or to a single smart infrastructure device that may share the request with other devices in a peer-to-peer manner. It should be noted that the manner in which a smart infrastructure device may be determined to be connected and accessible or not connected and inaccessible as described above is just one non-limiting example, and these determinations may be made in any number of other ways as well.

In some embodiments, the second phase may be the dynamic reconfiguration phase. The dynamic reconfiguration phase may be the phase during which the software deployment for the smart infrastructure system may be configured or reconfigured for deployment to the devices identified as accessible during the discovery phase. As mentioned above, such reconfiguration may be performed either locally by a centralized processing node and/or any smart infrastructure devices associated with a particular smart infrastructure system, or may be performed remotely as well. For example, a software image as described below may be created and/or reconfigured either at the centralized processing node and/or any smart infrastructure devices associated with a particular smart infrastructure system or at the remote location. In some instances, the software deployment may involve the creation of a software image. In other instances, instead of a new software image being created, a prior software image for the smart infrastructure system may be a reconfigured version of a previous software image that was created to deploy at the smart infrastructure system for a previous software update. The number and/or types of devices that were determined to be accessible in the smart infrastructure system at the time of the prior software deployment and the number and/or types of devices that were determined to be accessible in the smart infrastructure system for the current deployment may be compared to determined how the software image needs to be reconfigured. For example, if the smart infrastructure system included four devices at the time of the prior software update, and it is determined that only three of the four devices are currently accessible, then the software image for the current deployment may need to be reconfigured to only include the three accessible devices. The reconfigured software image may then be deployed to the smart infrastructure system to update the devices that are determined to be accessible.

In some embodiments, the process for updating a software image to correspond to a current status (for example, a current number and types of smart infrastructure devices that may be connected and accessible within the smart infrastructure system) of the smart infrastructure system may be performed as follows. The initial configuration of the given smart infrastructure system including a number and/or types of smart infrastructure devices included within the smart infrastructure system may be stored during physical installation of the smart infrastructure devices. When the software update is being prepared for deployment to the smart infrastructure system, a comparison between a the initial configuration and a current configuration may be performed by enumerating the devices in the expected configuration and attempting to connect to them (for example, using the methods described above to determine if smart infrastructure devices are connected and accessible). If it is determined that a different number of smart infrastructure devices are determined to be connected and accessible in the smart infrastructure system, then the software image associated with the initial configuration of the smart infrastructure system may be modified to fit the current configuration (for example, if a smart infrastructure device is offline for any number of reasons). The software image may consists of two parts: one or more execution binaries and one or more configuration files. The execution binaries may remain untouched, and the configuration files may be modified to match the current configuration of the smart infrastructure system before the software update is actually performed. The updates software image may then be installed one the connected and accessible smart infrastructure devices (which, for example, may be managed by the central processing node in the smart infrastructure system, but may also be managed by one or more of the smart infrastructure devices themselves as well). Additionally, in some cases, software images may also be configured not just for all of the smart infrastructure devices, but also for certain subsets of the smart infrastructure devices as well. For example, a software update may only be intended for smart infrastructure devices of a certain device type in the smart infrastructure system. In such cases, the software image may be created to only include the updates for those particular types of smart infrastructure devices. Furthermore, once a current configuration for a smart infrastructure system is determined, this may serve to replace the initial configuration as the baseline or comparison with a current configuration for a subsequent software deployment. That is, the number of devices that are connected during a first software deployment may be stored and used as the baseline for a comparison to a number of devices that are connected during a second, subsequent software deployment. However, in some cases, the initial configuration of the smart infrastructure system at initial physical installation may remain as the baseline for comparison with subsequent current configurations through any number of subsequent software deployments as well.

In some embodiments, once the software update is deployed to the smart infrastructure systems, data pertaining to the devices determined to be accessible during the discovery phase may be provided for local or remote storage. For example, the data may pertain to the number of devices identified as accessible and the types of devices identified as accessible. This data may be stored in order to track the devices that are accessible at some or all of the smart infrastructure systems that may exist in an environment. As an example, this data may be used to track when certain devices are physically added to and/or removed from a smart infrastructure system. The data may also be used for other purposes, such as identifying when certain devices within a smart infrastructure system may be malfunctioning. For example, if it is known which devices are physically installed at a given smart infrastructure system, then if a device is determined to be inaccessible, it may be because the device is malfunctioning rather than because the device was removed from the smart infrastructure system. In this case, when it is determined that a device may be malfunctioning, maintenance workers may be dispatched to the location of the malfunctioning device to perform repairs. In addition to, or alternatively to, providing this data after the software deployment, the data may also be provided before and/or during software deployment (for example, during the discovery phase). Similarly, the discovery and reconfiguration process can be run periodically, outside of new software deployment, to provide more frequent issue detection and diagnostics and ensure proper operation of the node, even if in a degraded state. Running the discovery and reconfiguration process periodically may also allow for devices that were previously unconnected and inaccessible, but become connected or accessible for any number of reasons (for example, maintenance is performed on a device that is malfunctioning) to be identified in real-time. As an example, if an initial smart infrastructure system includes five devices and it is determined that only four of the devices are connected and accessible, then a software image may be created to update only those four connected devices. However, if the fifth device were to become connected subsequent to the software deployment, this may be identified and a software update may then be provided to the fifth device as well (for example, through a software image reconfigured to update only the fifth device, or a software image configured to update all five of the devices).

In some embodiments, there may be a number of advantages of this dynamically reconfigurable smart infrastructure software deployment methodology over conventional smart infrastructure software deployment. One example advantage may be that information about devices on smart infrastructure systems is compiled and provided as updated are rolled out or devices are rebooted. This may eliminate the need to physically check each of the devices at the smart infrastructure system location to determine if they are connected to the network. A second example advantage may be that the smart infrastructure system may still function in some capacity even if some of the devices on the system are not properly functioning. Even if one camera goes down, this does not necessarily mean the whole system goes down. That is, even if one or multiple devices in the smart infrastructure system are down, the functionality of the other devices may be available. This stems from the dynamic reconfiguration ability of the smart infrastructure. A third example advantage may be, that any given smart infrastructure system may be able to maintain high uptime by only deploying new software with whichever devices are accessible, rather than failing to deploy because not all of the devices are accessible. A fourth example advantage may include the detectability of any devices that are no longer accessible, which allows for troubleshooting of smart infrastructure systems to identify devices that may be malfunctioning.

In some embodiments, the second manner in which the systems and methods described herein may remedy the inefficiencies of conventional smart infrastructure software deployment methods may through the use of peer-to-peer networks to distribute the software updates. A peer-to-peer network may be a network of interconnected "nodes" that are capable of transferring data directly between one another rather than sending and receiving data to other nodes using a centralized device, such as a server, as an intermediary. With respect to the smart infrastructure systems described herein, the nodes may include individual devices within any of the smart infrastructure systems existing on the network. In some cases, the nodes may also include the smart infrastructure systems as a whole, or even groups of multiple smart infrastructure systems. The nodes may also include entities beyond the smart infrastructure systems. For example, the nodes may include any other entity that may be used to send and/or receive data to and from any devices in a smart infrastructure system. As described below, some examples of such entities may include autonomous or non-autonomous vehicles, electric scooters, mobile devices, such as smart phones, etc. Thus, in the peer-to-peer network as described above, any of the nodes may be capable of sending and/or receiving software updates directly without the use of a central server (the specific manner in which such data transfers take place may be described in further detail below, and may be visually depicted in at least FIG. 2). In some instances, the peer-to-peer networks may also be ad-hoc networks. An ad-hoc network may be a temporary network that may be established to allow data transfer to take place directly between two nodes as described above. The ad-hoc network may thus be formed to allow the peer-to-peer data transfers to take place and once the data transfer takes place, may be ended.

In some embodiments, the use of the peer-to-peer ad-hoc networks may allow software updates to be quickly and efficiently distributed throughout a network of smart infrastructure systems. For example, the peer-to-peer network may allow software updates to be distributed between devices on a single smart infrastructure system and/or between devices on distinct smart infrastructure systems. For example, in some cases multiple smart infrastructure systems may include the same number and/or types of devices. In such cases, a software update may be provided to one of the smart infrastructure systems, and that system may subsequently distribute that software update to any other smart infrastructure systems that are determined to include the same number and/or types of devices. As another example, a full software update may only be provided to a single device within a smart infrastructure system, and that device may then distribute that software update to other devices on the smart infrastructure system, as well as to other devices on other smart infrastructure systems. The full software update may be alternatively be split into discrete portions, and these portions may be provided to one device or multiple devices on one or more smart infrastructure systems. For example, a full software update may be split into two separate portions, each including 50% of the full software update. Each of these portions may be provided to different devices on one or different smart infrastructure systems, and these devices may transmit the portions to other devices. The other devices may then distribute the portions to even further devices, and so on, until some or all of the devices in the smart infrastructure systems have both portions of the software update. The use of this peer-to-peer distribution method may be beneficial in that data may be distributed more quickly than if a centralized system were required to deploy the software update to each smart infrastructure system. The distribution method may also be beneficial in that not all smart infrastructure systems need to be connected to a software deployment system. That is, only one smart infrastructure system may need to be connected to the software deployment system, and may subsequently distribute to other smart infrastructure systems that may not be to the software deployment system.

In some embodiments, in addition to being beneficial for distributing software updates between devices on a smart infrastructure system or between devices on multiple distinct smart infrastructure systems, the use of the peer-to-peer ad-hoc network may also be beneficial for purposes of providing the software update to the first smart infrastructure system to receive the software update (for example, the initial smart infrastructure system or device on the smart infrastructure system that initiates distribution of the software update to other devices and/or smart infrastructure systems). While the above-mentioned dynamic reconfiguration may involve distributing software updates from a centralized node, the use of the peer-to-peer network may allow the smart infrastructure systems to receive the software update from other entities. For example, if the smart infrastructure is infrastructure that is located at a road intersection, the software updates may be received from one or more vehicles that pass through, or nearby, the road intersection. This may be especially beneficial for infrastructure that may not necessarily be otherwise connected to a network that would allow it to receive the software updates (for example, infrastructure located in rural areas). Continuing the same example, the smart infrastructure may determine that it requires a new software update (or that a new software update is available). It may then identify that a vehicle is stopped at its associated intersection. While the vehicle is stopped, the infrastructure may request the software update to be provided by the vehicle. The vehicle may already have the software update stored locally, or may alternatively request the software update from a remote storage location. In some instances, the vehicle may not need to be stopped for the software update to be provided. For example, the smart infrastructure may continuously or periodically monitor a threshold distance around the region including the smart infrastructure system for incoming vehicles. When a vehicle enters the threshold distance, the smart infrastructure system may request the software update from the vehicle, and request that the vehicle provide as much of the software update as possible while the vehicle is still within communication range of the smart infrastructure system (for example, within the threshold distance). In some cases, the smart infrastructure system may specifically choose to request the software update from stopped vehicles because the stopped vehicle is more likely to remain within communication range of the smart infrastructure system for a longer period of time than a vehicle that is simply driving through. The smart infrastructure system may leverage information about smart infrastructure devices to determine how long a vehicle will be within communication range. For example, it may be known that a traffic light has a red light time of a minute. Given this, it may be determined how much of the software update can be transferred by the vehicle to the smart infrastructure system during that time. This information may be used to determine which vehicle and/or combination of vehicles to request a software update from and/or how much of a software update should be requested or is capable of being provided during that time. For example, a vehicle that is determined to be in a nearby parking lot within communication range of the smart infrastructure system may be ideal for data transfer because it is more likely to remain within communication range of the smart infrastructure system for a longer period of time than a vehicle that is simply driving through an intersection.

In some embodiments, the software update may be initiated by the vehicle itself instead of the smart infrastructure system. For example, a vehicle may determine that smart infrastructure at intersection it enters requires an update (or has an available update), and may subsequently establish an ad-hoc network with the infrastructure to provide the update to the infrastructure. In some instances, a vehicle may be intentionally dispatched to a given smart infrastructure in order to provide a software update to the smart infrastructure system. For example, the computing device as described above may determine that a particular smart infrastructure system requires an update or has an available update, and may, instead of directly sending the software image over a network to the smart infrastructure system, dispatch a vehicle to the location of the smart infrastructure system to establish an ad-hoc connection with the smart infrastructure system to provide the software update to the smart infrastructure system. As described above, this may be beneficial when it is determined that the smart infrastructure system may not have long-range network communication capabilities (for example, may not be able to connect to the computing device to directly receive the software update). In even further cases, a smart infrastructure system may receive a software update (directly from the computing device or from a vehicle through an ad-hoc connection) and may provide the software update to a vehicle that enters a threshold distance of the smart infrastructure system so that the vehicle may then travel to another smart infrastructure system and provide the software update to that other smart infrastructure system.

In some embodiments, the data comprising a full software update may not be provided by a single vehicle, but may rather be provided in segments (the terms "segment" and "portion" may be used interchangeably herein) by multiple vehicles. Continuing the above example, a first vehicle that stops at the intersection (or merely enters an intersection) may provide a segment of the software update to the infrastructure at the intersection (as an arbitrary example, the first vehicle may provide 50% of the data required for the software update). A second vehicle may then stop at the intersection (or enter the intersection) and provide the remaining 50% of the data required for the software update to the infrastructure. In some cases, the data transfer may be segmented because each vehicle may only have access to a certain portion of the required data. In some cases, the data transfer may be segmented because the amount of time the vehicle is within communication range of the infrastructure may be shorter than the amount of time required to transfer all of the data required for the full software update. That is, it may be undesirable to force the vehicle to remain at the intersection while it waits for the full software update to be transferred to the infrastructure. In other cases, the data transfer may also be segmented between multiple vehicles within the intersection at the same time to reduce the amount of data each vehicle needs to transmit to the smart infrastructure system, which reduces the amount of time to transfer the full software update to the smart infrastructure. As described above, the segments each vehicle is to provide to the smart infrastructure system may also be pre-allocated to various vehicles to be deployed to a smart infrastructure system. Although the above example describes only two vehicles transferring data to the infrastructure, the data transfer may be further segmented between any number of vehicles (or any other type of mobile entities or different combinations of types of mobile entities), and each vehicle may transfer any percentage of the software update (that is, the amount of data that each vehicle transfers does not have to be equal).

In some embodiments, the establishment of a peer-to-peer ad-hoc network may involve a preliminary handshake process between two nodes that seek to form the ad-hoc network. In some cases, the handshake process may be a standard network handshake process. In some cases, the handshake process may also include additional steps beyond a typical handshake process, such as determining what types of data may be provided, how long it may take to transfer a certain amount of data, how long a connected can be maintained for, and any other initial coordination steps between two nodes of the ad-hoc network.

It should be noted that although reference may be made herein to exchanging data for the purpose software updates of smart infrastructure systems, the systems and methods described herein may also be uses for purposes of any other types of data transmissions as well. To name a new non-limiting examples, other purposes may include downloading runtime data downloaded from smart infrastructure to debug issues and/or use for future testing, analyzing results, obtaining metrics, and/or sharing data between different, unconnected smart infrastructure systems. Additionally, while the systems and methods described herein may involve vehicles providing data to smart infrastructure, the opposite may also be applicable. That is, the vehicle may be receiving data from the infrastructure and may distribute the data to other vehicles.

Illustrative Use Cases

FIG. 1 depicts a use case 100 exemplifying the dynamic reconfiguration as described above. The use case 100 may begin with a first scene 102 of the use case 100. The first scene 102 of the use case 100 may be representative of the discovery phase of the dynamic reconfiguration as described above. Depicted within the first scene 102 may be a road intersection 104 including a smart infrastructure system 106. The smart infrastructure system 106 may comprise several smart infrastructure devices, including a first traffic light 108a, a second traffic light 108b, a third traffic light 108c, a fourth traffic light 108d, a first crosswalk sign 108e, and a second crosswalk sign 108f. The smart infrastructure system 106 may also include a central processing node 110 that may be responsible for managing the smart infrastructure devices. The central processing node 110 may be included in any of the smart infrastructure devices, or may be separate from the smart infrastructure devices (it should be noted that while the central processing node 110 is depicted as being included in the intersection 104, this is merely for illustrative purposes, and the central processing node 110 may not be physically located in the middle of the road intersection 104). The first scene 102 of the use case 100 may also depict a remote system 112 (which, for example, may be a remote server). In some instances, the remote system 112 may have stored a hardware configuration 116 for the smart infrastructure system 106, which may be a listing of the various smart infrastructure devices known to be included within the smart infrastructure system 106. For example in this case, the hardware configuration may indicate that the smart infrastructure system includes the first traffic light 108a, the second traffic light 108b, the third traffic light 108c, the fourth traffic light 108d, the first crosswalk sign 108e, and the second crosswalk sign 108f. It should be noted that the smart infrastructure system 106 described in use case 100 (as well as any other smart infrastructure systems described herein) may merely be exemplary, and a smart infrastructure system may also include any other combination of types of smart infrastructure devices and number of smart infrastructure devices. Additionally, the description of the smart infrastructure system 106 being located at a road intersection 104 may also be exemplary, and a smart infrastructure system may also exist in any other location and be used for any other number of purposes as well. Furthermore, while the smart infrastructure system 106 maybe described as including a central processing node 110, in some cases, a smart infrastructure system may exist without a central processing node as well.

In some embodiments, the first scene 102 of the use case 100 may involve the remote system 112 determining that a software update 114 is available for the smart infrastructure system 106. In some cases however, this determination may be made by elements other than the remote system 112 as well, such as the central processing node 110, any of the smart infrastructure devices, and/or a mobile entity (not depicted in the figure, but described with respect to use case 200 of FIGS. 2A-2B described below). Once it is determined that the software update 114 is available for the smart infrastructure system 106, the use case 100 may proceed to a second scene 120 (which may still be scene of the discovery phase). The second scene 120 of the use case 100 may involve determining which of the smart infrastructure devices are accessible within the smart infrastructure system 106. A smart infrastructure device being accessible may mean that the smart infrastructure device is able to form a network connection (or other type of connection) in order to receive the software update. This determination may be performed as follows. First, the remote system 112 may send a request 122 to the central processing node 110 of the smart infrastructure system 106 to determine which of the smart infrastructure devices are accessible. The central processing node 110 may then send an output signal 124 to each of the smart infrastructure devices. The output signal 124 may be in the form of a request for the smart infrastructure devices to provide a return signal 126 to indicate that they received the output signal 124 and are accessible on the smart infrastructure system 106 (FIG. 1 may depict output signals 124 and return signals 126 being transmitted to and from only some of the smart infrastructure devices to simplify the drawing, but output signals 124 and return signals 126 may similarly be exchanged with any of the other smart infrastructure devices). Any devices that a return signal 126 is not received from may be determined to be inaccessible. For example, as depicted in FIG. 1, the second crosswalk sign 118f may not provide a return signal 126, and thus may be determined to be inaccessible. Once it is determined which of the smart infrastructure devices are accessible, the centralized processing node 110 may provide a list of the accessible smart infrastructure devices to the remote system 112. The remote system 112 may store this list as an updated hardware configuration 117 for future reference. In some instances, the remote system 112 may also compare the updated hardware configuration 117 with the previous hardware configuration 116 to determine which smart infrastructure devices have become inaccessible since the prior hardware configuration 116 was saved. This comparison may be used to determine how to reconfigure a software image used to perform the software update if the software image is based on a previous software image. The comparison may also be used for a number of other purposes, such as to determine if any of the smart infrastructure devices are malfunctioning. For example, since the updated hardware configuration 117 may only include a list of five devices (all of the devices except the second crosswalk sign 108f), then it may be determined that the second crosswalk sign 108f is malfunctioning. This information may also be used to dispatch a maintenance crew to the smart infrastructure system 106 to perform maintenance work on the second crosswalk sign 108f.

In some embodiments, the use case 100 may continue with a third scene 130, which may be representative of the dynamic reconfiguration phase as described above. The third scene 130 of the use case 100 may involve creating a new software image, or reconfiguring a prior software image, based on the information received from the smart infrastructure system 106 about which of the smart infrastructure devices were determined to be accessible. In the particular use case 100, the software image may be created including software updates for the five accessible smart infrastructure devices, including the first traffic light 108a, the second traffic light 108b, the third traffic light 108c, the fourth traffic light 108d, and the first crosswalk sign 108e. Alternatively, a prior software image including the total of six smart infrastructure devices may be reconfigured to form the software image for the five accessible smart infrastructure devices. In either case, the software image may then be provided to the central processing node 110 through a signal 132. The software update may then be installed on the five accessible smart infrastructure devices through the centralized processing node 110.

Figure 2A:
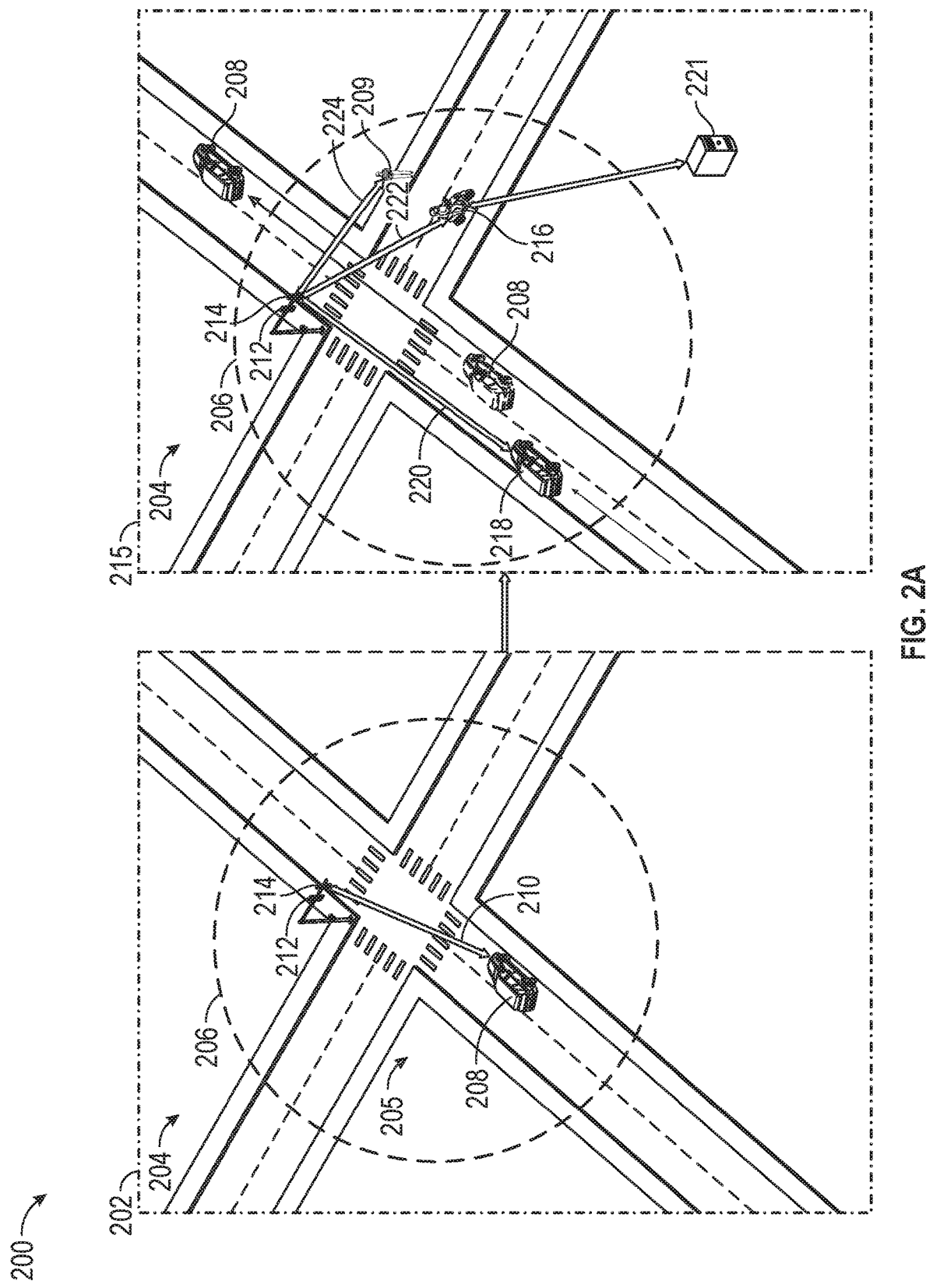
FIGS. 2A-2B depict an example use case, in accordance with one or more example embodiments of the disclosure.

FIG. 2A depicts a use case 200 exemplifying an initial data transfer to and/or from smart infrastructure systems using peer-to-peer ad-hoc networks. It should be noted that use case 200 may merely be one example of data transfer using peer-to-peer ad-hoc networks to provide a more detailed visual example, and the data transfer may take place in any number of other ways over peer-to-peer ad-hoc network connections as may be described elsewhere herein. Additionally, as mentioned previously, providing a software update may only be only example of data that may be transferred using these peer-to-peer networks, and any other types of data may be transferred as well. The use case 200 may begin with a first scene 202 of the use case 200. The first scene 202 of the use case 200 may depict a road intersection 204 that includes a smart infrastructure system 205 comprising a first traffic light 212 and a second traffic light 214. The first traffic light 212 and a second traffic light 214 may be smart infrastructure devices as described herein. The smart infrastructure system 205 may also be associated with an imaginary geofence 206, which may be located at a threshold distance in all directions from the smart infrastructure system 205. The geofence 206 may represent the maximum distance at which ad-hoc peer-to-peer networks may be established with mobile entities, such as the first vehicle 208. In some instances, however, the geofence 206 may not represent the maximum distance, but may represent a distance before the maximum distance. Continuing with the first scene 202 of the use case 200, it may be determined that the smart infrastructure system 205 requires (or has available) a software update (for example, a software update for the first traffic light 212 and/or the second traffic light 214) (the manner in which this determination is made, as well as the associated systems responsible for this determination, may not be shown in the figure, but the determination may be made based on any methods and/or systems described herein. For example, the determination may be made by a mobile entity, such as the vehicle 208, by the smart infrastructure system 205 itself, or some other external system or device). Once it is determined that the smart infrastructure system 205 requires a software update or otherwise has a software update available, the smart infrastructure system 205 may determine if there are any mobile entities within the geofence 206 from which the software update may be obtained. In the example use case 200, the smart infrastructure system 205 may identify that there is a vehicle 208 within the geofence 206. The smart infrastructure system 205 may then establish an ad-hoc peer-to-peer network connection 210 with the vehicle 208. Alternatively, the vehicle may initiate the establishment of the ad-hoc peer-to-peer network connection 210 as well (for example, if the vehicle 208 is checking smart infrastructure systems 205 it drives by to determine if they require (or have available) software updates, or if the vehicle 208 is specifically dispatched to the smart infrastructure system 205 for the purpose of providing a software update to the smart infrastructure system 205). The ad-hoc peer-to-peer network connection 210 may also instead be established with one or more of the individual smart infrastructure devices (such as the first traffic light 212 and/or the second traffic light 214), or may be established with a centralized processing node (not shown in the FIG, but may be visualized in FIG. 1, for example) that may manage all of the devices within the mart infrastructure system 205. After the ad-hoc peer-to-peer network 210 is established, a portion of the software update may be transferred from the vehicle 208 to the smart infrastructure system 205 (for example, the smart infrastructure system 205 may request the software update from the vehicle 208 or the vehicle 208 may simply provide the software update without receiving a request). For the purposes of this use case 200, the vehicle 208 may be described as only providing a portion of the software update, however, in other cases, the vehicle 208 may also provide the full software update. In the instances where the portion of the software update is only provided to one of the smart infrastructure devices (for example, only provided to the first traffic light 212), the smart infrastructure devices may form peer-to-peer ad-hoc connections with other smart infrastructure devices within the smart infrastructure system 205 to distribute the software update to those other devices. For example, the first traffic light 212 may form a peer-to-peer ad-hoc connection with the second traffic light 214 and distribute the portion of the update to the second traffic light 214. That is, in these instances, the mobile entity may be used to provide the software update to a subset of the smart infrastructure device(s) in the smart infrastructure system 205, and that subset of device(s) may then distribute the portion of the software update to the other devices in the smart infrastructure system 205.

Continuing with a second scene 215 of the use case 200, the vehicle may 208 drive outside the geofence 206 of the smart infrastructure system 205 before the smart infrastructure system 205 receives the full software update. In some cases, it may be intentional that the vehicle 208 only provides a portion of the software update. However, in other cases, the vehicle 208 may also simply be unable to transfer the full software update in the amount of time it remains within the geofence 206. Given this, the smart infrastructure system 205 may leverage other mobile entities to obtain the remainder of the software update. For example, the smart infrastructure system 205 may determine that a second vehicle 218 enters the geofence 206. The smart infrastructure system 205 may also determine that an electric scooter 216 and mobile device 209 are also within the geofence 206. The smart infrastructure system 205 may then establish a first ad-hoc peer-to-peer network 220 with the second vehicle 218, a second ad-hoc peer-to-peer network 222 with the electric scooter 216, and a third ad-hoc peer-to-peer network 224 with the mobile device 209. Alternatively, the smart infrastructure system 205 may only establish ad-hoc peer-to-peer networks with one or some of the mobile entities (for example, the second vehicle 218, the electric scooter 216 and/or, the mobile device 209). After establishing the ad-hoc peer-to-peer networks, the smart infrastructure system 205 may request the remainder of the software update from some or all of the mobile entities. As with the first vehicle 208 in the first scene 202 of the use case 200, the mobile entities may alternatively provide the remainder of the software update without receiving a request from the smart infrastructure system 205. The remaining portion of the software update may be split into corresponding sub portions for each of the mobile entities to provide. For example, if the portion of the software update provided by the first vehicle 208 was 25% of the full software update, the second vehicle 218 may provide a sub portion comprising 25% of the remainder of the software update, the electric scooter 216 may provide a sub portion comprising 25% of the remainder of the software update, and the mobile device may provide a sub portion comprising 25% of the remainder of the software update. These 25% sub portions are merely exemplary, and each of the sub portions may comprise any other percentage of the remainder of the software update as well. Additionally, the manner in which it is determined how to allocate the percentage of the software update for each mobile entity to provide may be determined by the smart infrastructure 205, or alternatively, the mobile entities themselves may coordinate what percentage of the software update they each want to provide. It also may be determined that only one or some of the mobile entities should provide portions or all of the remaining software update. For example, if the second vehicle 218 already has the software update stored locally, and the electric scooter 216 does not, then it may be more efficient for the second vehicle 218 to provide all of the remaining portion of the software update itself. However, in other cases, a mobile entity that may not already have the software update or a portion of the software update locally stored for distribution to the smart infrastructure system 205, it may request the software update or the portion of the software update from a remote source 221, such as a remote server and/or even another mobile entity that may be outside the geofence 206. For example, as shown in the figure, the electric scooter 216 requests a portion of the remaining software update from the remote source 221 so that it may provide that portion of the remaining software update to the smart infrastructure system 205.

Figure 2B:
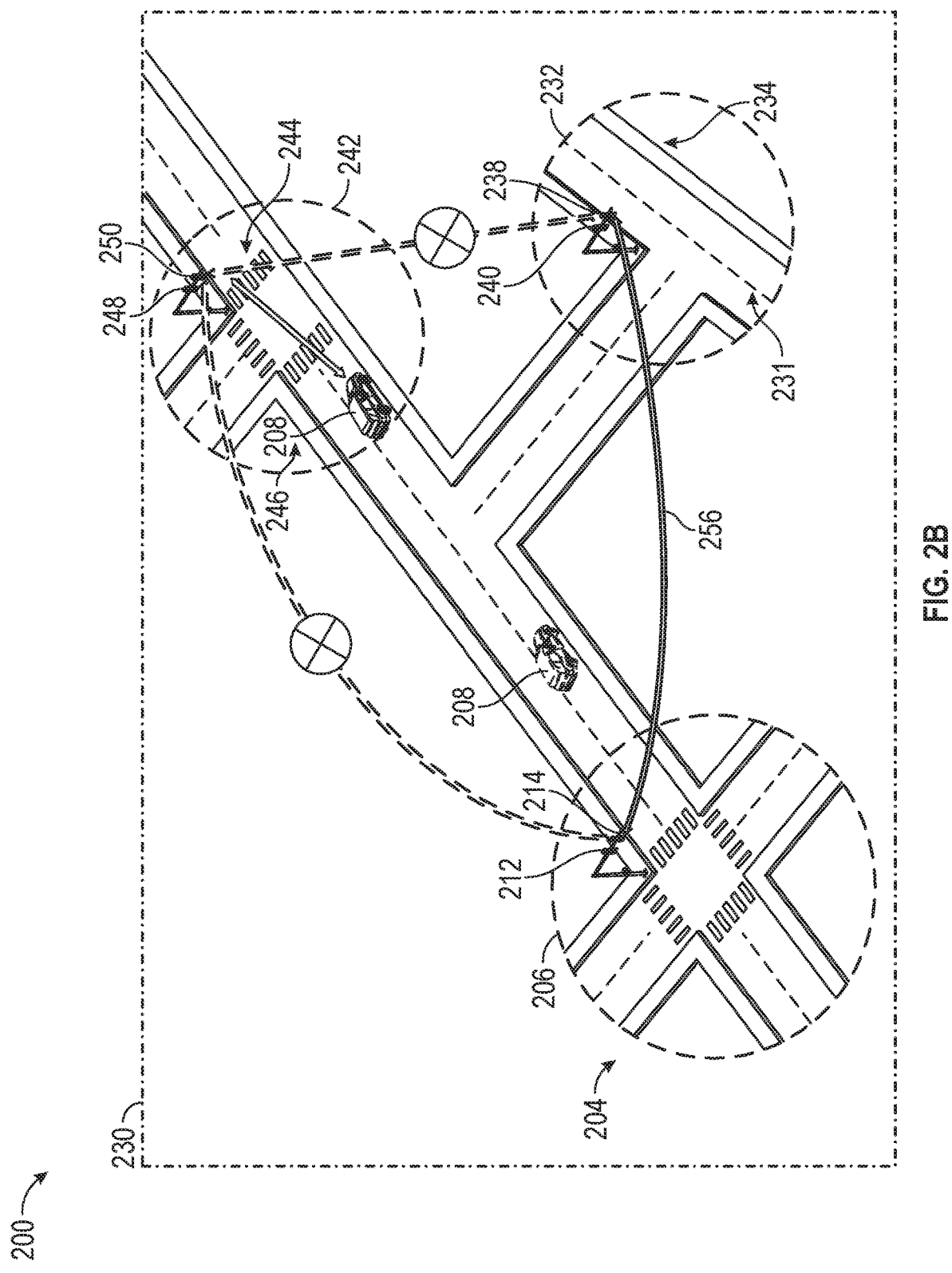

FIG. 2B depicts a third scene 230 of use case 200 in which the software update provided to the smart infrastructure system 205 may be distributed to a second smart infrastructure system 234 and/or a third smart infrastructure system 244 (and/or any number of other smart infrastructure systems not depicted in the figure). As shown in the figure, smart infrastructure system 205 may be capable of establishing a network connection 256 with smart infrastructure system 234. The network connection 256 may be, for example, an ad-hoc peer-to-peer network connection. However, in some cases, the network connection 256 may also be a more permanent network connection, such as a connection over a cellular network (or any other type of network connection, for example, as described with respect to FIG. 5 below). The network connection 256 between the smart infrastructure system 205 and the second smart infrastructure system 234 may allow the software update to be directly distributed from the smart infrastructure system 205 to the second smart infrastructure system 234. Once the software update is received by the second smart infrastructure system 234, it may be installed on the devices at the second smart infrastructure system 234 as well. In some embodiments, the peer-to-peer distribution of software updates may take place at the device level as aforementioned. For example, while above it may have been described that the smart infrastructure system 205 distributes the software update to the second smart infrastructure system 234, any of the individual devices on the smart infrastructure system 205 may be responsible for distributing some or all of the software update to one or more of the devices on the smart infrastructure system 234. That is, each device on the smart infrastructure system 205 may be responsible for distributing a portion of the software update to the smart infrastructure system 234 or a device of the smart infrastructure system 234 in order to increase the rate at which the software update is distributed.

Continuing with the third scene 230 of the use case 200, it may be determined that a third smart infrastructure 244 is not able to form a direct network connection with another smart infrastructure system in order to directly receive the software update from another smart infrastructure system.

For example, the third smart infrastructure system 244 may be located in a rural setting that does not the networking capabilities to allow the third smart infrastructure system 244 to connect to the other smart infrastructure systems (for example, smart infrastructure system 205 and/or the second smart infrastructure system 234 over a long range network connection). Given this, the third smart infrastructure system 244 may instead have to rely on one or more mobile entities, such as the vehicle 208 (which may be the same vehicle described with respect to FIG. 2A) to receive the software update. This may be achieved in a similar manner to which the smart infrastructure system 205 initially received the software update from the vehicle 208 as described with respect to FIG. 2A.

Illustrative Methods

Figure 3:
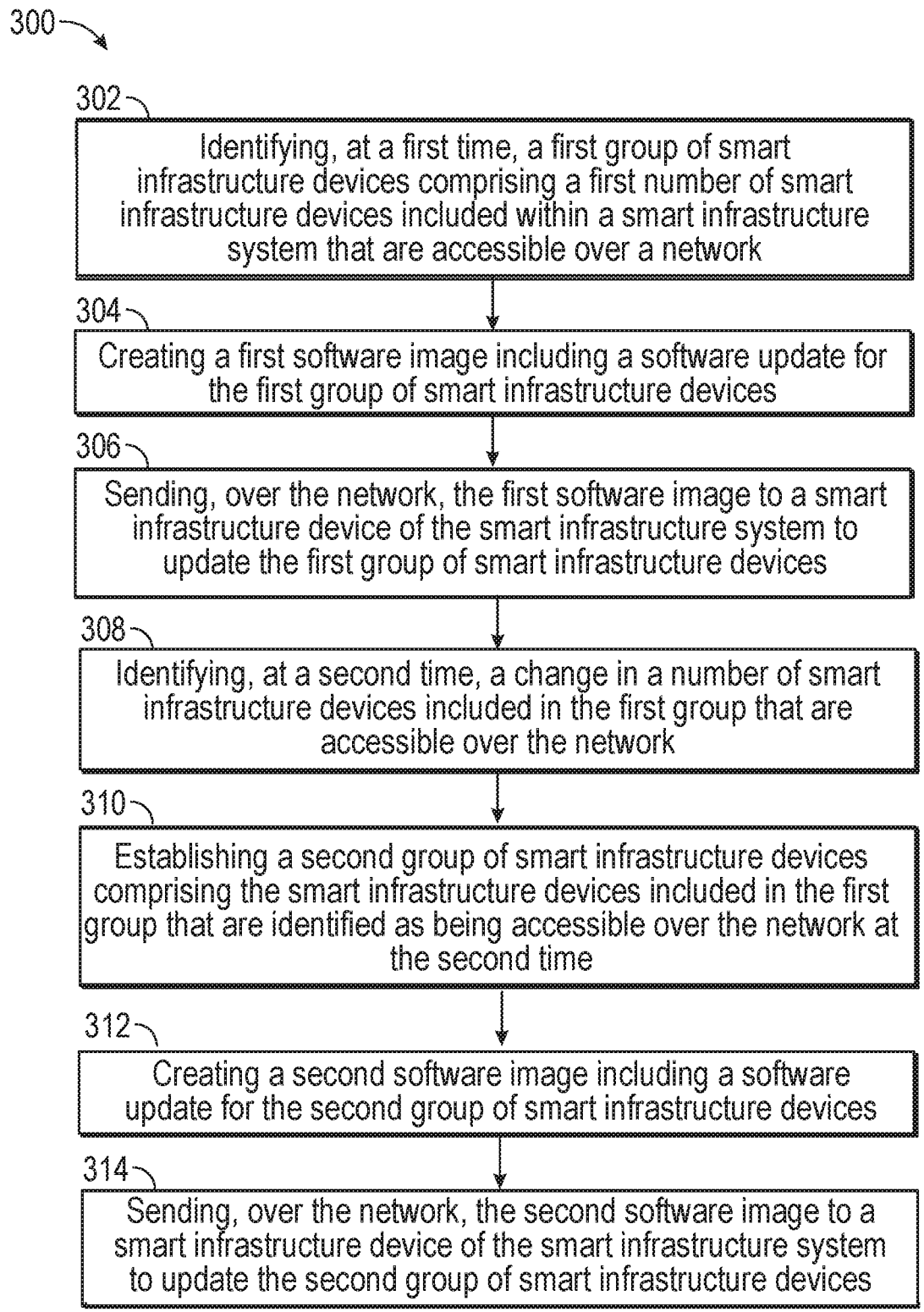
FIG. 3 depicts an example method, in accordance with one or more example embodiments of the disclosure.

FIG. 3 is an example method 300. At block 302 of the method 300 in FIG. 3, the method may include identifying, at a first time, a first group of smart infrastructure devices comprising a first number of smart infrastructure devices included within a smart infrastructure system that are accessible over a network. Block 304 of the method 300 may include creating a first software image including a software update for the first group of smart infrastructure devices. At the time of initial physical setup of the smart infrastructure devices on the smart infrastructure system, a reference hardware configuration may be stored that may indicate which smart infrastructure devices are located at the smart infrastructure system. As an example, a smart infrastructure system located at a road intersection may include a first traffic camera, a second traffic camera, a first traffic light, and a second traffic light. This reference hardware configuration may include any number of types of data pertaining to the smart infrastructure devices installed in the smart infrastructure system, such as a smart infrastructure device type, a smart infrastructure device function, a smart infrastructure device software revision, or any other type of data. In some cases, the first number of smart infrastructure devices may not only refer to an initial physical setup, but may also refer to a number of smart infrastructure devices identified as being connected and accessible during a prior software deployment as well.

Block 306 of the method 300 may include sending, over the network, the first software image to a smart infrastructure device of the smart infrastructure system to update the first group of smart infrastructure devices. In some embodiments, the software image may be created remotely to the smart infrastructure system. However, in some cases, the software image may be created locally to the smart infrastructure system as well. For example, if the software image is created locally to the smart infrastructure system, it may be created by a central processing node and/or any of the smart infrastructure devices within the smart infrastructure system. In such cases, sending the first software image may involve local communications between the central processing node and/or smart infrastructure devices in a smart infrastructure system. Additionally, in some cases software images may also be shared between distinct smart infrastructure systems as well. For example, a software image may be created at a remote location and provided to two or more smart infrastructure systems. As another example, a software image may be created by one smart infrastructure system and subsequently provided to one or more other smart infrastructure systems as well.

Block 308 of the method 300 may include identifying, at a second time, a change in a number of smart infrastructure devices included in the first group that are accessible over the network. Block 310 of the method 300 may include establishing a second group of smart infrastructure devices comprising the smart infrastructure devices included in the first group that are identified as being accessible over the network at the second time. Block 312 of the method 300 may include creating a second software image including a software update for the second group of smart infrastructure devices. For example, it may be determined that one or more smart infrastructure devices have become unconnected or inaccessible since a prior software deployment. In such cases, a software image used for a subsequent software deployment may be reconfigured or newly created to match the number of smart infrastructure devices that are currently connected and accessible. As described above, the software image may be created or reconfigured locally to the smart infrastructure system (for example, at the centralized processing node or any of the smart infrastructure devices) or remotely from the smart infrastructure system as well.

Block 314 of the method 300 may include sending, over the network, the second software image to a smart infrastructure device of the smart infrastructure system to update the second group of smart infrastructure devices. However, in some cases, the software image may be created locally to the smart infrastructure system as well. For example, if the software image is created locally to the smart infrastructure system, it may be created by a central processing node and/or any of the smart infrastructure devices within the smart infrastructure system. In such cases, sending the first software image may involve local communications between the central processing node and/or smart infrastructure devices in a smart infrastructure system. Additionally, in some cases software images may also be shared between distinct smart infrastructure systems as well. For example, a software image may be created at a remote location and provided to two or more smart infrastructure systems. As another example, a software image may be created by one smart infrastructure system and subsequently provided to one or more other smart infrastructure systems as well.

The operations described and depicted in the illustrative process flow of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Illustrative System Architecture

Figure 4:
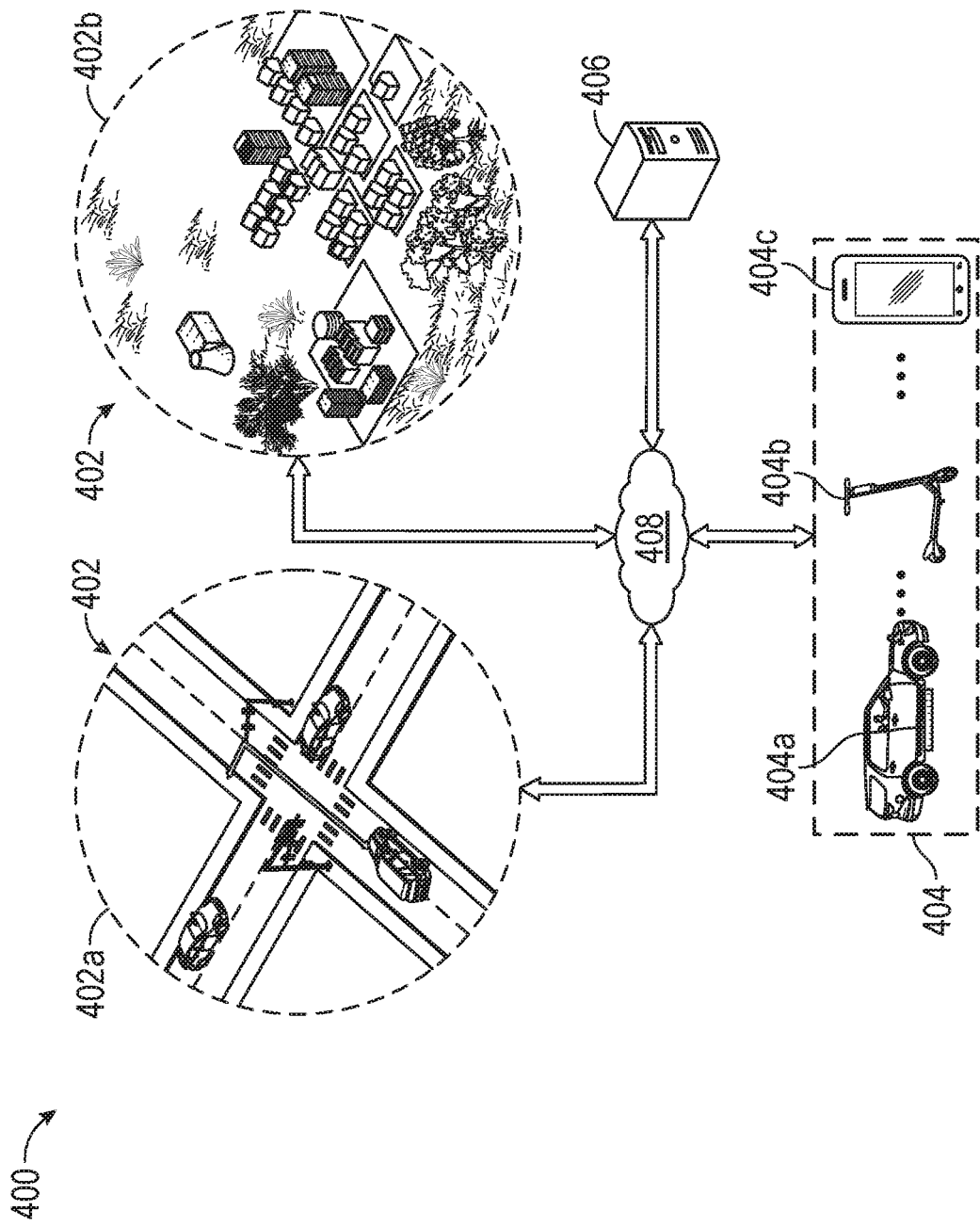
FIG. 4 depicts a schematic illustration of an example system architecture, in accordance with one or more example embodiments of the disclosure.

FIG. 4 illustrates an example system 400, in accordance with one or more embodiments of this disclosure. The system 400 may be representative of a system used to facilitate improved software updates of smart infrastructure systems as described herein (for example, as illustrated through the use cases of FIGS. 1-2). In some embodiments, the system 400 may include one or more smart infrastructure systems 402 (for example, smart infrastructure system 402, smart infrastructure system 402b, or any number of smart infrastructure systems). The system 400 may also include one or more mobile entities 404 (for example, mobile entity 404a, mobile entity 404b, mobile entity 404c, or any number of mobile entities) and a management device 406. In some instances, any of the smart infrastructure systems 402, mobile entities 404, and/or the management device 406 may communicate over a communications network 408.

In some embodiments, the communications network 408 may include any one or a combination of multiple different types of networks, such as cable networks, the Internet, wireless networks, and other private and/or public networks. In some instances, the communications network 408 may include cellular, Wi-Fi, or Wi-Fi direct. In some embodiments, the network may involve communications between vehicles in the network and/or between vehicles in the network and elements external to the network. For example, Vehicle-to-Vehicle (V2V), Vehicle-to-Infrastructure (V2I), Vehicle-to-Everything (V2X), and/or Dedicated Short Range Communications (DSRC), to name a few, may be used. The communications network 408 may also be a peer-to-peer network. A peer-to-peer network may be a network of interconnected "nodes" that are capable of transferring data directly between one another rather than sending and receiving data to other nodes using a centralized device, such as a server, as an intermediary. With respect to the smart infrastructure systems described herein, the nodes may include individual devices within any of the smart infrastructure systems existing on the network. In some cases, the nodes may also include the smart infrastructure systems as a whole, or even groups of multiple smart infrastructure systems. The nodes may also include entities beyond the smart infrastructure systems. For example, the nodes may include any other entity that may be used to send and/or receive data to and from any devices in a smart infrastructure system. As described above, some examples of such entities may include autonomous or non-autonomous vehicles, electric scooters, mobile devices, such as smart phones, etc. In some instances, the peer-to-peer networks may also be ad-hoc networks. An ad-hoc network may be a temporary network that may be established to allow data transfer to take place directly between two nodes as described above. The ad-hoc network may thus be formed to allow the peer-to-peer data transfers to take place and once the data transfer takes place, may be ended. Thus, the communications network 408 may be temporary in some cases and permanent in other cases. The communications network 408 may also simultaneously include both temporary and permanent connections as well. For example, a connection between the management device 406 and smart infrastructure systems 402 may be a permanent network connection and a connection between the mobile entities 404 and the smart infrastructure systems may be temporary. These however, are merely examples, and any of the network connections between any elements described in this system 400 may either be temporary and/or permanent.

In some embodiments, the smart infrastructure systems 402 may refer to any infrastructure that is capable of communicating with components that are located externally to the infrastructure. A single smart infrastructure system 402 may comprise one or more smart infrastructure devices included within a given geographical region. In some instances, the smart infrastructure devices that are included within the smart infrastructure system 402 may serve a common goal (for example, managing traffic at a road intersection, as described in the example smart infrastructure 402a). Smart infrastructure systems 402a and 402b depict two examples of such smart infrastructure systems 402. For example, smart infrastructure system 402a may depict smart infrastructure located at a road intersection 410. The example smart infrastructure system 402a may be used to manage traffic at the road intersection 410. To this end, the smart infrastructure system 402a may include several smart infrastructure devices 412 used to assist in managing the traffic at the road intersection 410. For example, such smart infrastructure devices 412 may include a first crosswalk sign 412a, a second crosswalk sign 412b, a third crosswalk sign 412c, and a fourth cross walk sign 412d. The smart infrastructure devices 412 may also include a first traffic light 412e, a second traffic light 412f, a third traffic light 412g, and a fourth traffic light 412h. That is, the smart infrastructure system 402a as a whole may comprise a grouping of smart infrastructure devices 412 including the four crosswalk signs and the eight traffic lights. The smart infrastructure system 402a and the devices included within the smart infrastructure system 402a may be defined by a geographical region, such as the road intersection 410 in this case. However, smart infrastructure systems 402 and the devices they include may be defined in any other number of ways. For example, a smart infrastructure system may include a group of smart infrastructure devices that serve a common purpose (for example, managing a traffic intersection). A second example smart infrastructure system 402b may include smart infrastructure devices 412 used to assist in the distribution of power from a power plant to residential homes. For example, the smart infrastructure system 402b may include a management device 412i at a power plant, one or more line-monitoring devices 412j, and/or one or more residential home monitoring devices 412i. These smart infrastructure systems 402a and 402b are merely examples of types of smart infrastructure systems 402 and any other type of smart infrastructure may be applicable as well.

In some embodiments, mobile entities 404 (for example, mobile entity 404a, mobile entity 404b, mobile entity 404c, or any number of mobile entities) may include any entity that is generally capable of moving from one location to another (for example, traversing the geographical region in which a smart infrastructure system 402 is located). As depicted in the figure, mobile entity 404a may be a vehicle, mobile entity 404b may be an electric scooter, and mobile entity 404c may be a mobile phone. To provide further examples, in the context of the example smart infrastructure system 402a, mobile entities 404 may include vehicles 414, bikes 415, and/or mobile phones 416. However, these are merely examples of mobile entities, and any other type of entity may be applicable, such as an unmanned aerial vehicle (UAV) drone, for example. In some embodiments, a mobile entity 404 may include memory (as may be described below with respect to the example computing device 500 of FIG. 5) that may be used to store software updates for the smart infrastructure devices that comprise a smart infrastructure system 402. A single mobile entity 404 may be capable of storing a full software update itself, but may also only store a portion of a software update. In some cases, the mobile entity 404 may not locally store the software update, but may instead request the software update from an external source, such as the management device 406. In such cases, the mobile entity 404 may merely serve as an intermediary between the smart infrastructure system 402 and the external source where the software update is located.

In some embodiments, management device 406 may be a device that is to, among other purposes, to monitor the status of the smart infrastructure systems 402. That is, the management device 406 may be used to request and/or receive data about the number and/or types of smart infrastructure devices that are accessible on a given smart infrastructure system 402. The management device 406 may store the status of any smart infrastructure system 402. The management device 406 may also determine when a software update is available and/or required for some or all of the smart infrastructure systems 402 and/or individual smart infrastructure devices located within a given smart infrastructure system 402. To this end, the management device 406 may facilitate the creation of the software image to be used to perform the software update, as well as providing the image to the relevant smart infrastructure systems 402. In some instances, the management device 406 may be a single, centralized device, such as a server. In some cases there may exist multiple management devices 406, each responsible for a group of smart infrastructure systems 402. In even further cases, each smart infrastructure system 402 may have its own associated management device 406.

Figure 5:
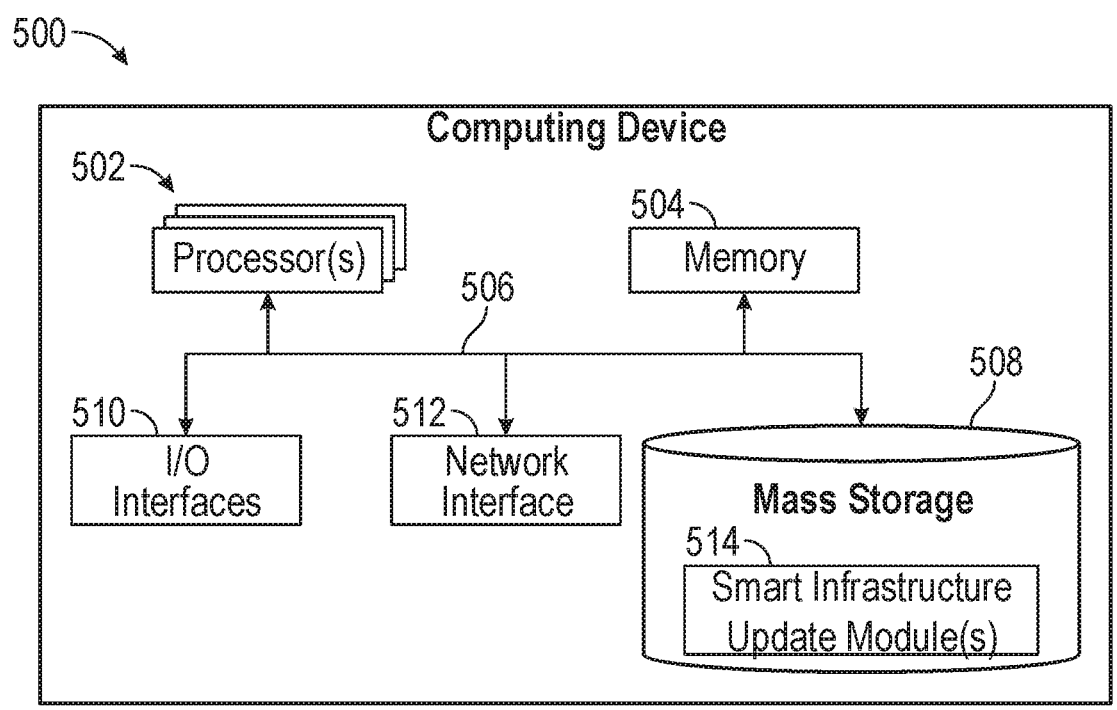
FIG. 5 depicts a schematic illustration of an example computing device architecture, in accordance with one or more example embodiments of the disclosure.

FIG. 5 illustrates an example computing device 500, in accordance with one or more embodiments of this disclosure. The computing 500 device may be representative of any number of elements described herein, such as any of the smart infrastructure systems 402, the mobile entities 404, the management device 406, or any other element described herein. The computing device 500 may include at least one processor 502 that executes instructions that are stored in one or more memory devices (referred to as memory 504). The instructions can be, for instance, instructions for implementing functionality described as being carried out by one or more modules and systems disclosed above or instructions for implementing one or more of the methods disclosed above. The processor(s) 502 can be embodied in, for example, a CPU, multiple CPUs, a GPU, multiple GPUs, a TPU, multiple TPUs, a multi-core processor, a combination thereof, and the like. In some embodiments, the processor(s) 502 can be arranged in a single processing device. In other embodiments, the processor(s) 502 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 502 can access the memory 504 by means of a communication architecture 506 (e.g., a system bus). The communication architecture 506 may be suitable for the particular arrangement (localized or distributed) and type of the processor(s) 502. In some embodiments, the communication architecture 506 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 504 also can retain data, such as any ledger 156 information, among other data.

Each computing device 500 also can include mass storage 508 that is accessible by the processor(s) 502 by means of the communication architecture 506. The mass storage 508 can include machine-accessible instructions (e.g., computer-readable instructions and/or computer-executable instructions). In some embodiments, the machine-accessible instructions may be encoded in the mass storage 508 and can be arranged in components that can be built (e.g., linked and compiled) and retained in computer-executable form in the mass storage 508 or in one or more other machine-accessible non-transitory storage media included in the computing device 500. Such components can embody, or can constitute, one or many of the various modules disclosed herein. Such modules are illustrated as smart infrastructure update modules 514.

Execution of the smart infrastructure update modules 514, individually or in combination, by at least one of the processor(s) 502, can cause the computing device 500 to perform any of the operations described herein (for example, the operations described with respect to FIG. 3, as well as any other operations).

Each computing device 500 also can include one or more input/output interface devices 510 (referred to as I/O interface 510) that can permit or otherwise facilitate external devices to communicate with the computing device 500. For instance, the I/O interface 510 may be used to receive and send data and/or instructions from and to an external computing device.

The computing device 500 also includes one or more network interface devices 512 (referred to as network interface(s) 512) that can permit or otherwise facilitate functionally coupling the computing device 500 with one or more external devices. Functionally coupling the computing device 500 to an external device can include establishing a wireline connection or a wireless connection between the computing device 500 and the external device. The network interface devices 512 can include one or many antennas and a communication processing device that can permit wireless communication between the computing device 500 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A method comprising:
 identifying, at a first time, a first group of smart infrastructure devices comprising a first number of smart infrastructure devices included within a smart infrastructure system that are accessible over a network;
 creating a first software image including a software update for the first group of smart infrastructure devices;
 sending, over the network, the first software image to a smart infrastructure device of the smart infrastructure system to update the first group of smart infrastructure devices;

identifying, at a second time, a change in a number of smart infrastructure devices included in the first group that are accessible over the network;

establishing a second group of smart infrastructure devices comprising the smart infrastructure devices included in the first group that are identified as being accessible over the network at the second time;

creating a second software image including a software update for the second group of smart infrastructure devices; and sending, over the network, the second software image to a smart infrastructure device of the smart infrastructure system to update the second group of smart infrastructure devices.

2. The method of claim 1, wherein identifying, at the second time, the change in the number of smart infrastructure devices included in the first group that are accessible over the network further comprises:

sending a signal over the network to one or more devices of the smart infrastructure system;

receiving, from the one or more devices of the smart infrastructure system, an indication that a first smart infrastructure device of the first group is accessible over the network; and receiving, from the one or more devices of the smart infrastructure system, an indication that a second smart infrastructure device of the first group is not accessible over the network.

3. The method of claim 1, wherein the first time is during or after an initial installation of the first group of smart infrastructure devices in the smart infrastructure system.

4. The method of claim 1, wherein sending the second software image to the smart infrastructure device of the smart infrastructure system further comprises sending the second software image to a centralized node of the smart infrastructure system for installation on a smart infrastructure device included within the second group.

5. The method of claim 1, further comprising:

identifying, based on the identifying the change in the number of smart infrastructure devices included in the first group that are accessible over the network, that a device included within the smart infrastructure system is malfunctioning.

6. The method of claim 5, further comprising:

sending, based on the identification that the device included within the smart infrastructure system is malfunctioning, an indication for service to be performed on the device.

7. The method of claim 1, further comprising:

receiving an indication that a new device is included within the smart infrastructure system;

creating, based on the indication that a new device is included within the smart infrastructure system, a third software image including a software update for the new device; and sending, over the network, the third software image to a smart infrastructure device of the smart infrastructure system.

8. A system comprising:

a processor; and a memory storing computer-executable instructions, that when executed by the processor, cause the processor to:

identify, at a first time, a first group of smart infrastructure devices comprising a first number of smart infrastructure devices included within a smart infrastructure system that are accessible over a network;

create a first software image including a software update for the first group of smart infrastructure devices;

send, over the network, the first software image to a smart infrastructure device of the smart infrastructure system to update the first group of smart infrastructure devices;

identify, at a second time, a change in a number of smart infrastructure devices included in the first group that are accessible over the network;

establish a second group of smart infrastructure devices comprising the smart infrastructure devices included in the first group that are identified as being accessible over the network at the second time;

create a second software image including a software update for the second group of smart infrastructure devices; and send, over the network, the second software image to a smart infrastructure device of the smart infrastructure system to update the second group of smart infrastructure devices.

9. The system of claim 8, wherein identifying, at the second time, the change in the number of smart infrastructure devices included in the first group that are accessible over the network further comprises:

send a signal over the network to one or more devices of the smart infrastructure system;

receive, from the one or more devices of the smart infrastructure system, an indication that a first smart infrastructure device of the first group is accessible over the network; and receive, from the one or more devices of the smart infrastructure system, an indication that a second smart infrastructure device of the first group is not accessible over the network.

10. The system of claim 8, wherein the first time is during or after an initial installation of the first group of smart infrastructure devices in the smart infrastructure system.

11. The system of claim 8, wherein sending the second software image to the smart infrastructure device of the smart infrastructure system further comprises sending the second software image to a centralized node of the smart infrastructure system for installation on a smart infrastructure device included within the second group.

12. The system of claim 8, wherein the computer-executable instructions further cause the processor to:

identify, based on the identifying the change in the number of smart infrastructure devices included in the first group that are accessible over the network, that a device included within the smart infrastructure system is malfunctioning.

13. The system of claim 12, wherein the computer-executable instructions further cause the processor to:

send, based on the identification that the device included within the smart infrastructure system is malfunctioning, an indication for service to be performed on the device.

14. The system of claim 8, wherein the computer-executable instructions further cause the processor to:

receive an indication that a new device is included within the smart infrastructure system;

create, based on the indication that a new device is included within the smart infrastructure system, a third software image including a software update for the new device; and send, over the network, the third software image to a smart infrastructure device of the smart infrastructure system.

15. A non-transitory computer readable medium including computer-executable instructions stored thereon, which when executed by one or more processors, cause the one or more processors to perform operations of:

identifying, at a first time, a first group of smart infrastructure devices comprising a first number of smart infrastructure devices included within a smart infrastructure system that are accessible over a network;

creating a first software image including a software update for the first group of smart infrastructure devices;

sending, over the network, the first software image to a smart infrastructure device of the smart infrastructure system to update the first group of smart infrastructure devices;

identifying, at a second time, a change in a number of smart infrastructure devices included in the first group that are accessible over the network;

establishing a second group of smart infrastructure devices comprising the smart infrastructure devices included in the first group that are identified as being accessible over the network at the second time;

creating a second software image including a software update for the second group of smart infrastructure devices; and sending, over the network, the second software image to a smart infrastructure device of the smart infrastructure system to update the second group of smart infrastructure devices.

16. The non-transitory computer readable medium of claim 15, wherein identifying, at the second time, the change in the number of smart infrastructure devices included in the first group that are accessible over the network further comprises:

sending a signal over the network to one or more devices of the smart infrastructure system;

receiving, from the one or more devices of the smart infrastructure system, an indication that a first smart infrastructure device of the first group is accessible over the network; and receiving, from the one or more devices of the smart infrastructure system, an indication that a second smart infrastructure device of the first group is not accessible over the network.

17. The non-transitory computer readable medium of claim 15, wherein the first time is during or after an initial installation of the first group of smart infrastructure devices in the smart infrastructure system.

18. The non-transitory computer readable medium of claim 15, wherein sending the second software image to the smart infrastructure device of the smart infrastructure system further comprises sending the second software image to a centralized node of the smart infrastructure system for installation on a smart infrastructure device included within the second group.

19. The non-transitory computer readable medium of claim 15, wherein the computer-executable instructions further cause the one or more processors to perform operations of:

identifying, based on the identifying the change in the number of smart infrastructure devices included in the first group that are accessible over the network, that a device included within the smart infrastructure system is malfunctioning.

20. The non-transitory computer readable medium of claim 19, wherein the computer-executable instructions further cause the one or more processors to perform operations of:

sending, based on the identification that the device included within the smart infrastructure system is malfunctioning, an indication for service to be performed on the device.

* * * * *